United States Patent
Fukuda et al.

(10) Patent No.: US 11,466,119 B2
(45) Date of Patent: Oct. 11, 2022

(54) EPOXY RESIN, EPOXY RESIN COMPOSITION, EPOXY RESIN CURED PRODUCT, AND COMPOSITE MATERIAL

(71) Applicant: Showa Denko Materials Co., Ltd., Tokyo (JP)

(72) Inventors: Kazumasa Fukuda, Tokyo (JP); Yoshitaka Takezawa, Tokyo (JP); Naoki Maruyama, Tokyo (JP); Yuka Yoshida, Tokyo (JP); Tomoko Higashiuchi, Tokyo (JP)

(73) Assignee: Showa Denko Materials Co., Ltd., Tokyo (JP)

( * ) Notice: Subject to any disclaimer, the term of this patent is extended or adjusted under 35 U.S.C. 154(b) by 39 days.

(21) Appl. No.: 16/493,514

(22) PCT Filed: Mar. 5, 2018

(86) PCT No.: PCT/JP2018/008424
§ 371 (c)(1),
(2) Date: Sep. 12, 2019

(87) PCT Pub. No.: WO2018/168556
PCT Pub. Date: Sep. 20, 2018

(65) Prior Publication Data
US 2021/0130537 A1  May 6, 2021

(30) Foreign Application Priority Data
Mar. 15, 2017 (JP) .............. JP2017-050145

(51) Int. Cl.
C08G 59/50 (2006.01)
C08G 59/24 (2006.01)
C08G 59/22 (2006.01)

(52) U.S. Cl.
CPC ......... *C08G 59/504* (2013.01); *C08G 59/226* (2013.01); *C08G 59/24* (2013.01); *C08G 59/245* (2013.01); *C08G 59/5033* (2013.01)

(58) Field of Classification Search
CPC .... C08G 59/504; C08G 59/226; C08G 59/24; C08G 59/245; C08G 59/5033
USPC ...................................... 524/612
See application file for complete search history.

(56) References Cited

U.S. PATENT DOCUMENTS

| | | | |
|---|---|---|---|
| 2010/0160555 A1 | 6/2010 | Tanaka et al. | |
| 2012/0149807 A1* | 6/2012 | Asaumi | C07C 67/31 523/457 |
| 2014/0290996 A1* | 10/2014 | Moon | H05K 1/0373 174/258 |

FOREIGN PATENT DOCUMENTS

| | | | | |
|---|---|---|---|---|
| CN | 101720336 A | 6/2010 | | |
| EP | 2 133 380 A1 | 12/2009 | | |
| EP | 3 121 210 A1 | 1/2017 | | |
| JP | 09227654 A | * 9/1997 | ............. | C08G 59/06 |
| JP | 2010-47728 A | 3/2010 | | |
| JP | 2012-197366 A | 10/2012 | | |
| JP | 2013-119608 A | 6/2013 | | |
| JP | 2013-194167 A | 9/2013 | | |
| JP | 2015-3972 A | 1/2015 | | |
| JP | 6775735 B2 | 10/2020 | | |
| KR | 2009-0129487 A | 12/2009 | | |
| TW | 200844159 A | 11/2008 | | |
| TW | 201538557 A | 10/2015 | | |
| TW | 201542672 A | 11/2015 | | |
| TW | 201630959 A | 9/2016 | | |
| WO | WO-2008/123238 A1 | 10/2008 | | |
| WO | WO-2015/141797 A1 | 9/2015 | | |
| WO | WO-2015/146606 A1 | 10/2015 | | |
| WO | WO-2016/104772 A1 | 6/2016 | | |
| WO | WO-2017/145412 A1 | 8/2017 | | |
| WO | WO-2017/209210 A1 | 12/2017 | | |

OTHER PUBLICATIONS

Yamamoto, JP 09-227654 A machine translation in English, Sep. 2, 1997 (Year: 1997).*

* cited by examiner

*Primary Examiner* — David T Karst
(74) *Attorney, Agent, or Firm* — Faegre Drinker Biddle & Reath LLP

(57) ABSTRACT

An epoxy resin, comprising an epoxy compound having a mesogenic structure, the epoxy compound comprising a first epoxy compound having one biphenyl structure in a molecule and a second epoxy compound that is different from the first epoxy compound, at a mass ratio of the first epoxy compound to the second epoxy compound (first epoxy compound:second epoxy compound) of from 10:100 to 50:100.

14 Claims, No Drawings

EPOXY RESIN, EPOXY RESIN COMPOSITION, EPOXY RESIN CURED PRODUCT, AND COMPOSITE MATERIAL

TECHNICAL FIELD

The invention relates to an epoxy resin, an epoxy resin composition, an epoxy resin cured product, and a composite material.

BACKGROUND ART

Epoxy resin is used in various applications for its excellent thermal resistance. In view of a trend of increasing the use temperature of a power device, improvement in thermal conductivity of epoxy resin has been studied.

An epoxy resin including an epoxy compound having a mesogenic structure in its molecule (hereinafter, also referred to as a mesogen-containing epoxy resin) is known to exhibit excellent thermal conductivity. However, since a mesogen-containing epoxy resin generally has a higher viscosity than other epoxy resins, fluidity may not be sufficient during the processing.

In this regard, addition of a solvent to reduce viscosity may be a possible way to improve the fluidity of a mesogen-containing epoxy resin. Further, as a mesogen-containing epoxy resin having excellent fluidity and thermal conductivity, an epoxy resin having a specific molecular size, obtained by reacting an epoxy monomer having a mesogenic structure with a divalent phenol compound, has been proposed (see, for example, Patent Document 1).

PRIOR ART DOCUMENTS

Patent Document

[Patent Document 1] International Publication No. WO 2016-104772

SUMMARY OF THE INVENTION

Problems to be Solved by the Invention

In a method of adding a solvent to a mesogen-containing epoxy resin, formation of voids due to the solvent may occur during curing, and affect the product quality. The mesogen-containing epoxy resins obtained by the method described in Patent Document 1 achieves a lowered softening point, but is still high in viscosity and yet to be improved in terms of handleablitiy.

In view of the above, the invention aims to provide an epoxy resin and an epoxy resin composition having excellent handleability. The invention also aims to provide an epoxy resin cured product and a composite material obtained by using the epoxy resin or the epoxy resin composition.

Means for Solving the Problem

The means for solving the problem include the following embodiments.

<1> An epoxy resin, comprising an epoxy compound having a mesogenic structure, the epoxy compound comprising a first epoxy compound having one biphenyl structure in a molecule and a second epoxy compound that is different from the first epoxy compound, at a mass ratio of the first epoxy compound to the second epoxy compound (first epoxy compound:second epoxy compound) of from 10:100 to 50:100.

<2> The epoxy resin according to <1>, wherein the first epoxy compound comprises an epoxy compound represented by the following Formula (A):

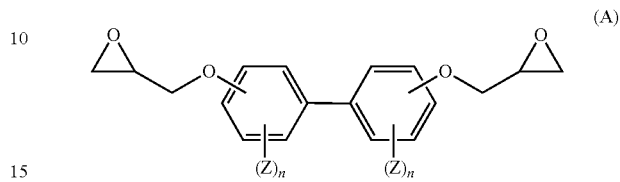

wherein, in Formula (A), each Z independently represents an aliphatic hydrocarbon group having 1 to 8 carbon atoms, an aliphatic alkoxy group having 1 to 8 carbon atoms, a fluorine atom, a chlorine atom, a bromine atom, an iodine atom, a cyano group, a nitro group or an acetyl group; and each n independently represents an integer from 0 to 4.

<3> The epoxy resin according to <1> or <2>, wherein the second epoxy compound comprises an epoxy compound represented by the following Formula (B):

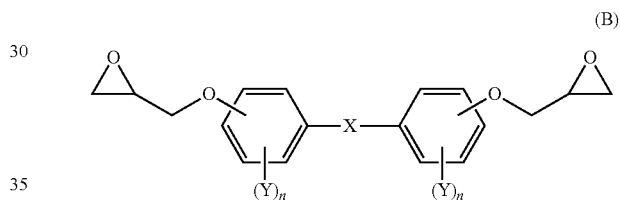

wherein, in Formula (B), X represents a linking group comprising at least one divalent group selected from the following Group (I):

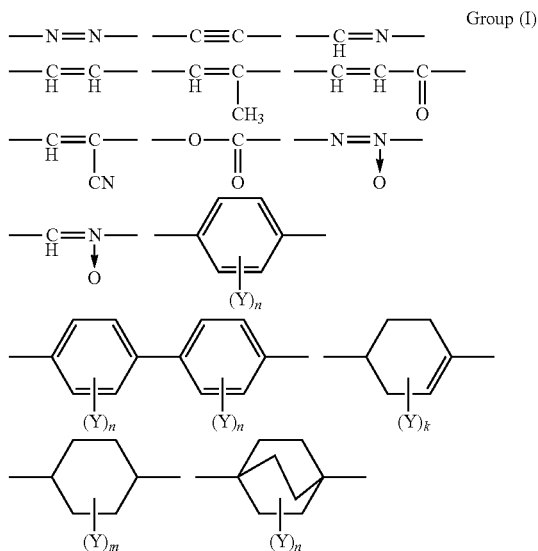

each Y independently represents an aliphatic hydrocarbon group having 1 to 8 carbon atoms, an aliphatic alkoxy group having 1 to 8 carbon atoms, a fluorine atom, a chlorine atom, a bromine atom, an iodine atom, a cyano group, a nitro group or an acetyl group; and each n independently represents an integer from 0 to 4.

<4> The epoxy resin according to any one of <1> to <3>, wherein the mass ratio of the first epoxy compound to the second epoxy compound (first epoxy compound:second epoxy compound) is from 10:100 to 25:100.

<5> The epoxy resin according to any one of <1> to <4>, having a viscosity at 60° C. of less than 200 Pa·s.

<6> An epoxy resin composition, comprising the epoxy resin according to any one of <1> to <5> and a curing agent.

<7> The epoxy resin composition according to <6>, wherein the curing agent comprises an amine compound having a benzene ring or a naphthalene ring.

<8> The epoxy resin composition according to <7>, wherein the amine compound has an amino group that is directly bonded to the benzene ring or the naphthalene ring.

<9> The epoxy resin composition according to any one of <6> to <8>, having a crosslink density of 7 mmol/cm$^3$ or less when the epoxy resin composition is cured.

<10> The epoxy resin composition according to any one of <6> to <9>, having a fracture toughness of 1.2 MPa·m$^{1/2}$ or more when the epoxy resin composition is cured.

<11> A cured epoxy resin obtained by curing the epoxy resin composition according to any one of <6> to <10>.

<12> A composite material, comprising the cured epoxy resin according to <11> and a reinforcing material.

<13> The composite material according to <12>, having a structure configured by layering at least a cured product-containing layer, comprising the cured epoxy resin, and at least one reinforcing material-containing layer, comprising the reinforcing material.

Effect of the Invention

According to the invention, an epoxy resin and an epoxy resin composition having excellent handleability are provided. Further, an epoxy resin cured product and a composite material obtained by using the epoxy resin or the epoxy resin composition are provided.

EMBODIMENTS FOR IMPLEMENTING THE INVENTION

In the following, the embodiments for implementing the invention are explained. However, the invention is not limited to the embodiments. The elements of the embodiments (including steps) are not essential, unless otherwise stated. The numbers and the ranges thereof do not limit the invention as well.

In the disclosure, the "process" refers not only to a process that s independent from the other steps, but also to a step that cannot be clearly distinguished from the other steps, as long as the aim of the process is achieved.

In the disclosure, the numerical range represented by "from A to B" includes A and B as a minimum value and a maximum value, respectively.

In the disclosure, when numerical ranges are described in a stepwise manner, the values of the upper or lower limit of each numerical range may be substituted by the values of the upper or lower limit of the other numerical range, or may be substituted by the values described in the Examples.

In the disclosure, when there are more than one kind of substances corresponding to a component of a composition, the content of the component refers to a total content of the substances, unless otherwise stated.

In the disclosure, a "layer" or a "film" may be formed over an entire region or may be formed over part of a region, upon observation of the region.

In the disclosure, the term "layered" refers to a state in which a layer is positioned on another layer, and the layers may be bounded to each other, or may be detachable.

In the disclosure, the epoxy compound refers to a compound having an epoxy group in its molecule. The epoxy resin refers to a collective concept of epoxy compounds that are not in a cured state.

<Epoxy Resin>

The epoxy resin of the embodiment is an epoxy resin, comprising an epoxy compound having a mesogenic structure, the epoxy compound comprising a first epoxy compound having one biphenyl structure in a molecule and a second epoxy compound that is different from the first epoxy compound, at a mass ratio of the first epoxy compound to the second epoxy compound (first epoxy compound:second epoxy compound) of from 10:100 to 50:100.

The inventors have found that an epoxy resin that includes, as an epoxy compound having a mesogenic structure, both an epoxy compound having one biphenyl structure in a molecule and an epoxy compound that is different from the epoxy compound, is easy to decrease in viscosity when the temperature is increased and exhibits excellent handleability, even including an epoxy compound having a mesogenic structure. The reason for this is not clear but is considered to be a high degree of compatibility due to the similarity in the structure of the epoxy compounds.

The mass ratio of the first epoxy compound to the second epoxy compound (first epoxy compound:second epoxy compound) may be from 10:100 to 29:100, from 10:100 to 25:100, from 10:100 to 20:100.

or may be from 10:100 to 20:100.

The epoxy compound having a mesogenic structure refers to an epoxy compound that forms a higher-order structure in a cured product obtained by curing the epoxy compound. Examples of the mesogenic structure include a biphenyl structure, a phenyl benzoate structure, a cyclohexyl benzoate structure, an azobenzene structure, a stilbene structure, a terphenyl structure, an anthracene structure, derivatives of these structures, and a structure in which two or more of these structures are linked via a linking group. The biphenyl structure refers to a structure in which two benzene reins are directly bonded to each other.

In the disclosure, the higher-order structure refers to a structure in which structural elements are arranged to form a micro-and-organized structure. Examples of the higher-order structure include a crystalline phase and a liquid crystalline phase, and existence thereof can be determined with a polarizing microscope. Specifically, existence of a higher-order structure can be determined by whether or not an interference pattern due to depolarization is observed under crossed Nicols. A higher-order structure generally exists in a cured product of an epoxy resin composition and forms a domain structure in the form of islands, wherein each island corresponds to a higher-order structure. The structural elements of the higher-order structure are generally formed by covalent bonding.

Examples of a higher-order structure formed in a cured product include a nematic structure and a smectic structure, which are a liquid crystal structure, respectively. The nematic structure is a liquid crystal structure that has only an orientational order in which molecules are arranged in one direction. The smectic structure is a liquid crystal structure that has a one-dimensional order in addition to an orientational order, and forms a lamellar structure. The degree of order is higher in a smectic structure than in a nematic structure. Therefore, a smectic structure is preferred in terms of thermal conductivity of a cured product.

Whether or not a smectic structure is formed in a cured product can be determined by X-ray diffraction measurement by using, for example, an X-ray diffractometer from Rigaku Corporation. When measurement is performed using CuKα1 line under a tube voltage of 40 kV, a tube current of 20 mA and a measurement range 2θ=1° to 30°, and a diffraction peak is observed in a range of 2θ=2° to 10°, it is determined that a smectic structure is formed in a cured product.

From the viewpoint of decreasing the viscosity of the epoxy resin, the ratio of the first epoxy compound to the total epoxy compound having a mesogenic structure is preferably greater. From the viewpoint of fracture toughness of a cured product, the ratio of the first epoxy compound to the total epoxy compound having a mesogenic structure is preferably smaller.

The epoxy resin may include an epoxy compound that is not an epoxy compound having a mesogenic structure. In that case, from the viewpoint of thermal conductivity of a cured product, the ratio of the epoxy compound having a mesogenic structure to the total epoxy resin is preferably 80% by mass or more, more preferably 90% by mass or more.

The viscosity of the epoxy resin may be selected depending on the application of the epoxy resin. From the viewpoint of handleability, for example, the epoxy resin preferably has a viscosity at 60° C. of less than 200 Pa·s. The viscosity at 60° C. of the epoxy resin is measured by the method as described in the following Examples.

(First Epoxy Resin)

The first epoxy resin has one biphenyl structure in a molecule. Specifically, an epoxy compound having two or more biphenyl structures in a molecule is not regarded as a first epoxy compound. Further, a structure in which three or more benzene rings are directly bonded (such as terphenyl structure) is not included in the biphenyl structure.

The epoxy resin may include a single kind of the first epoxy compound, or may include two or more kinds thereof.

The first epoxy compound is preferably an epoxy compound in which a glycidyl ether group is bonded to each of the two benzene rings that form a biphenyl group, more preferably an epoxy compound represented by the following Formula (A).

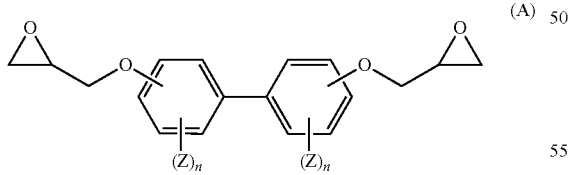

(A)

In Formula (A), each Z independently represents an aliphatic hydrocarbon group having 1 to 8 carbon atoms, an aliphatic alkoxy group having 1 to 8 carbon atoms, a fluorine atom, a chlorine atom, a bromine atom, an iodine atom, a cyano group, a nitro group or an acetyl group; and each n independently represents an integer from 0 to 4.

In Formula (A), each Z preferably independently an aliphatic hydrocarbon group having 1 to 8 carbon atoms, more preferably a methyl group. Further, each Z preferably independently is at a meta position with respect to the direct bond of the biphenyl structure. Each n is preferably independently from 1 to 3, more preferably 1 or 2.

(Second Epoxy Compound)

The second epoxy compound is not specifically limited as long as it has a mesogenic structure and is different from the first epoxy compound. The epoxy resin may include a single kind of second epoxy compound, or may include two or more kinds thereof.

The second epoxy compound preferably includes an epoxy compound represented by the following Formula (B).

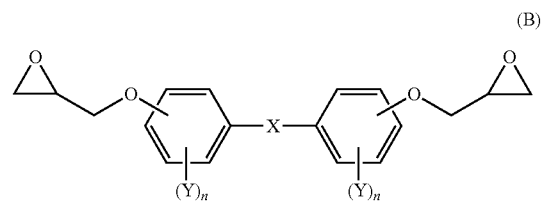

(B)

In Formula (B), X represents a linking group that includes at least one divalent group selected from the following Group (I). Each Y independently represents an aliphatic hydrocarbon group having 1 to 8 carbon atoms, an aliphatic alkoxy group having 1 to 8 carbon atoms, a fluorine atom, a chlorine atom, a bromine atom, an iodine atom, a cyano group, a nitro group or an acetyl group; and each n independently represents an integer from 0 to 4.

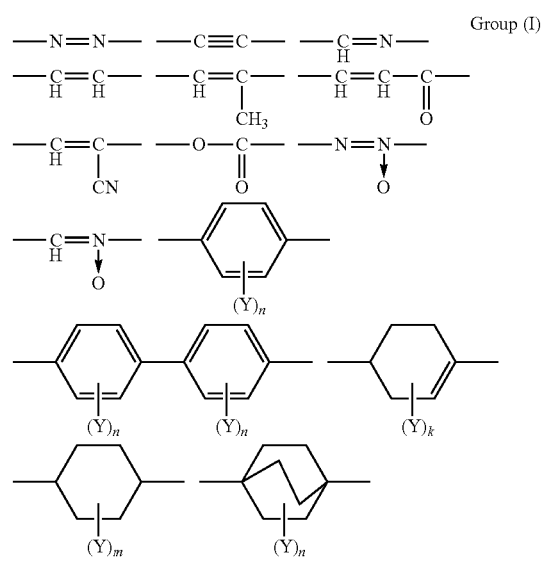

Group (I)

In Group (I), each Y independently represents an aliphatic hydrocarbon group having 1 to 8 carbon atoms, an aliphatic alkoxy group having 1 to 8 carbon atoms, a fluorine atom, a chlorine atom, a bromine atom, an iodine atom, a cyano group, a nitro group or an acetyl group; each n independently represents an integer from 0 to 4; k represents an integer from 0 to 7; m represents an integer from 0 to 8; and l represents an integer from 0 to 12.

In Formula (B) and Group (I), each Y preferably independently an aliphatic hydrocarbon group having 1 to 8 carbon atoms, more preferably a methyl group. Each n, k, m or l preferably independently 0.

The second epoxy compound may be a compound represented by Formula (B) in which X is a linking group that includes divalent groups having the following structures.

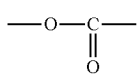 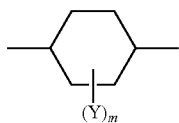

The second epoxy compound may be a compound having one or more structures represented by the following Formula (I).

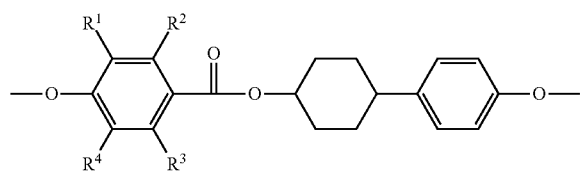

In Formula (I), each of $R^1$ to $R^4$ independently represents a hydrogen atom or an alkyl group having from 1 to 3 carbon atoms. Each of $R^1$ to $R^4$ is preferably independently a hydrogen atom or an alkyl group having 1 or 2 carbon atoms, more preferably a hydrogen atom or a methyl group, further preferably a hydrogen atom. The number of hydrogen atom represented by $R^1$ to $R^4$ is preferably from 2 to 4, more preferably 3 or 4, further preferably 4. When any one of $R^1$ to $R^4$ is an alkyl group having from 1 to 3 carbon atoms, the alkyl group is preferably at least one of $R^1$ or $R^4$.

An exemplary epoxy compound having one structure represented by Formula (I) is an epoxy compound represented by the following Formula (M).

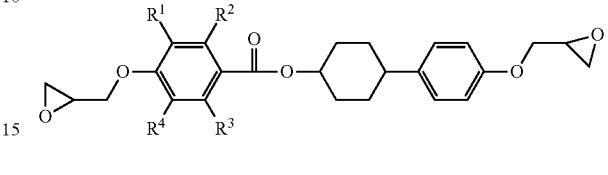

The examples and preferred ranges of $R^1$ to $R^4$ in Formula (M) are the same as the examples and preferred ranges of $R^1$ to $R^4$ in Formula (I).

Examples of the compound represented by Formula (M) include compounds described in Japanese Patent Application Laid-Open No. 2011-74366, specifically, at least one selected from the group consisting of 4-{4-(2,3-epoxypropoxy)phenyl}cyclohexyl=4-(2,3-epoxypropoxy)benzoate and 4-{4-(2,3-epoxypropoxy)phenyl}cyclohexyl=4-(2,3-epoxypropoxy)-3-methylbenzoate.

Examples of the epoxy compound having two or more structures represented by Formula (I) include an epoxy compound having at least one selected from the following structures represented by Formula (II-A) and Formula (II-B).

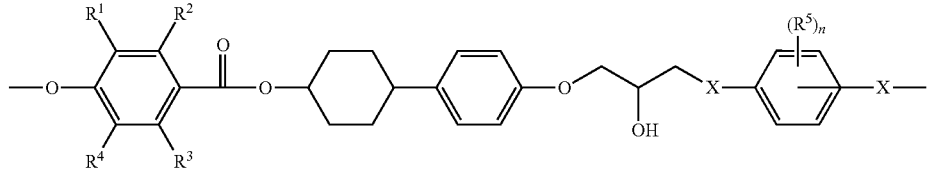

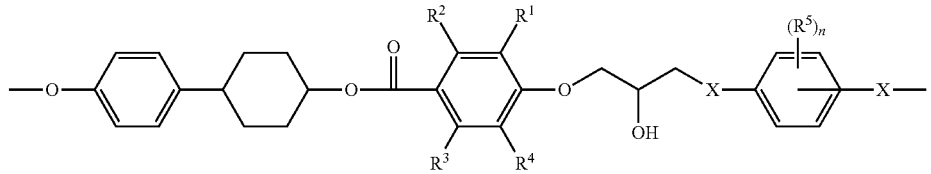

Specific examples and preferred ranges of $R^1$ to $R^4$ in Formula (II-A) and Formula (II-B) are the same as the examples and preferred ranges of $R^1$ to $R^4$ in Formula (I). Each $R^5$ independently represents an alkyl group having 1 to 8 carbon atoms, preferably an alkyl group having 1 to 3 carbon atoms, more preferably a methyl group. Each X independently represents —O— or —NH—.

In Formula (II-A) and Formula (II-B), each n independently represents an integer from 0 to 4, preferably an integer from 0 to 2, more preferably 0 or 1, further preferably 0.

From the viewpoint of forming a higher-order structure in a cured product, an epoxy compound having a structure represented by Formula (II-A) or (II-B) is preferably an epoxy compound having a structure represented by the following (II-a) or (II-b).

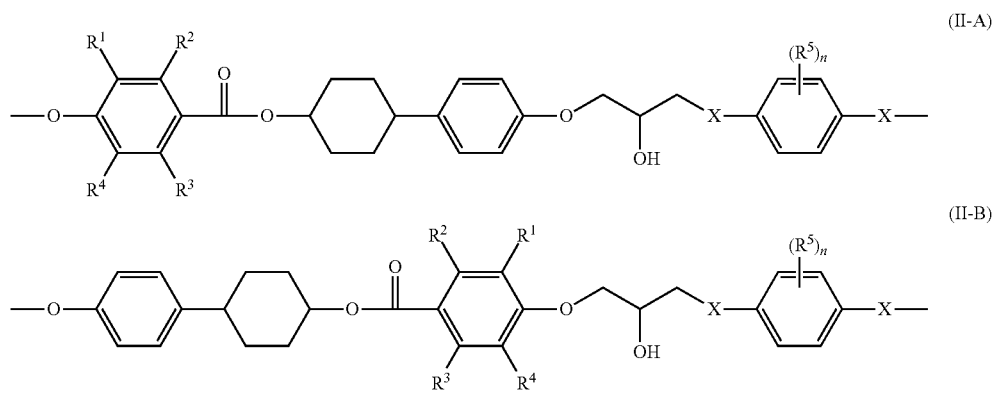

Definitions and preferred ranges of $R^1$ to $R^5$, n and X in Formulae (II-a) and (II-b) are the same as the definitions and the preferred ranges of $R^1$ to $R^5$, n and X in Formulae (II-A) and (II-B).

Examples of an epoxy resin having two structures represented by Formula (I) include an epoxy compound represented by at least selected from Formulae (III-A) to (III-C).

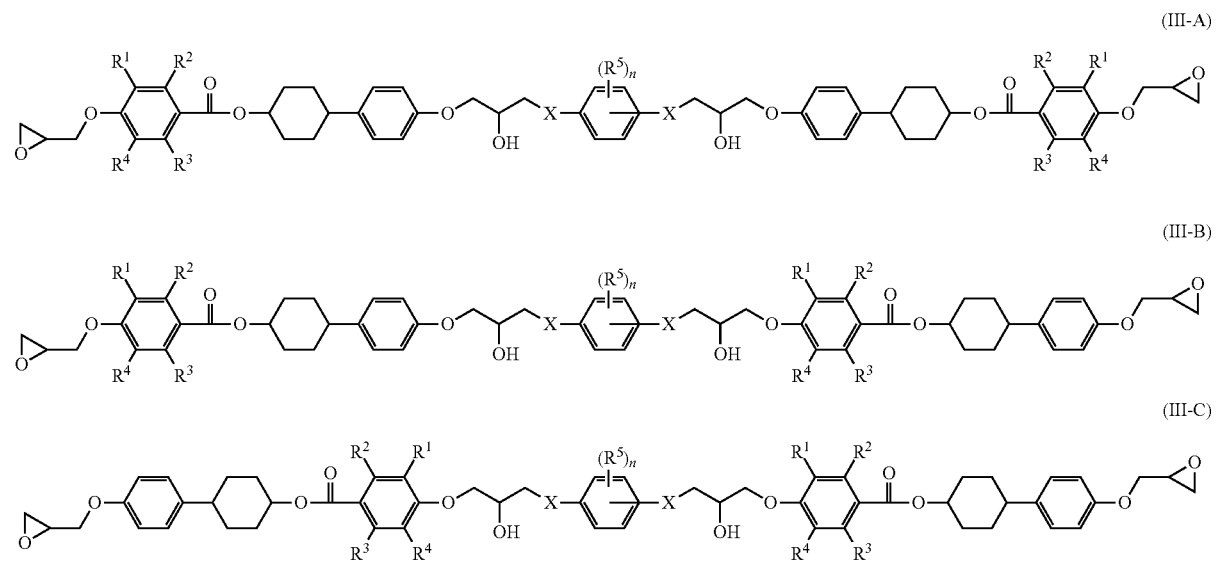

Definitions and preferred ranges of $R^1$ to $R^5$, n and X in Formulae (III-A) to (III-C) are the same as the definitions and the preferred ranges of $R^1$ to $R^5$, n and X in Formulae (II-A) and (II-B).

From the viewpoint of forming a higher-order structure in a cured product, the epoxy compound represented by Formulae (III-A) to (III-C) is preferably an epoxy compound represented by the following Formulae (III-a) to (III-c).

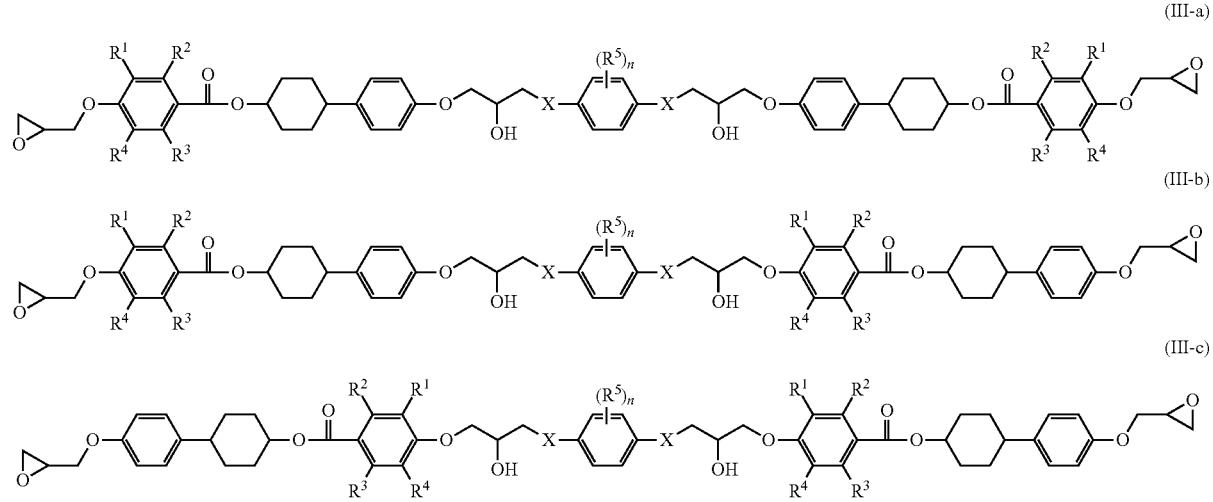

Definitions and preferred ranges of $R^1$ to $R^5$, n and X in Formulae (III-a) to (III-c) are the same as the definitions and the preferred ranges of $R^1$ to $R^5$, n and X in Formulae (III-A) to (III-C).

The second epoxy compound may include a combination of an epoxy compound having one mesogenic structure and an epoxy compound having two or more mesogenic structures. For example, the second epoxy compound may include a combination of an epoxy compound having one structure represented by Formula (I) and an epoxy compound having two or more structures represented by Formula (I).

In the combination as mentioned above, the number of a mesogenic structure (one or two or more) refers to the number of a mesogenic structure that exists in both compounds in common, and a mesogenic structure that does not exist in both compounds in common is not included therein.

Examples of a combination of an epoxy compound having one mesogenic structure and an epoxy compound having two or more mesogenic structures include a combination of an epoxy compound having one mesogenic structure (hereinafter, also referred to as an epoxy monomer) and an epoxy compound that is obtained by reaction of the epoxy monomers and has two or more mesogenic structures (hereinafter, also referred to as a multimer).

The method of obtaining a multimer through reaction of epoxy monomers is not specifically limited, and examples thereof include a method of causing self-polymerization of epoxy monomers, and a method of allowing an epoxy monomer to react with a compound having a functional group that can react with an epoxy group. In a case in which a multimer is obtained thorough reaction of epoxy monomers, reaction conditions may be adjusted in order to allow part of the epoxy monomer to remain unreacted, and the unreacted epoxy monomer and a multimer exist in the reaction product.

From the viewpoint of controlling the molecular weight of the multimer to be obtained, the ratio of the multimer to the epoxy monomer in the reaction product, and the like, a method of synthesizing a multimer by allowing an epoxy monomer to react with a compound having a functional group that can react with an epoxy group is preferred.

The method of reacting an epoxy monomer and a compound having a functional group that can react with an epoxy group is not specifically limited. For example, the reaction can be performed by dissolving an epoxy monomer and a compound having a functional group that is capable of reacting with an epoxy group, and optionally a reaction catalyst, in a solvent, and stirring the same while heating.

Alternatively, for example, the reaction can be performed by mixing an epoxy monomer and a compound having a functional group that is capable of reacting with an epoxy group, and optionally a reaction catalyst, without a solvent, and stirring the same while heating.

The solvent is not particularly limited, as long as it can dissolve an epoxy monomer and a compound having a functional group that is capable of reacting with an epoxy group of the epoxy monomer, and can be heated to a temperature required to cause reaction of the compounds. Specific examples of the solvent include cyclohexanone, cyclopentanone, ethyl lactate, propyleneglycol monomethyl ether, N-methyl pyrrolidone, methyl cellosolve, ethyl cellosolve, and propyleneglycol monopropyl ether.

The amount of the solvent is not particularly limited, as long as an epoxy monomer and a compound having a functional group that is capable of reacting with an epoxy group of the epoxy monomer, and optionally a reaction catalyst, can be dissolved at a reaction temperature. Although the degree of solubility depends on the type of the raw materials, the solvent and the like, the viscosity of the solvent after the reaction tends to be in a preferred range when the solvent is used in an amount that adjusts an initial solid content concentration to be from 20% by mass to 60% by mass, for example.

The compound having a functional group that is capable of reacting with an epoxy group of the specific epoxy monomer is not particularly limited. From the viewpoint of forming a smectic structure in a cured product, the compound is preferably at least one selected from the group consisting of a dihydroxybenzene compound, having a structure in which two hydroxy groups are bonded to a benzene ring; and a diaminobenzene compound, having a structure in which two amino groups are bonded to a benzene ring (hereinafter, also referred to as specific aromatic compounds).

Examples of the dihydroxybenzene compound include 1,2-dihydroxybenzene (catechol), 1,3-dihydroxybenzene (resorcinol), 1,4-dihydroxybenzene (hydroquinone) and derivatives of these compounds.

Examples of the diaminobenzene compound include 1,2-diaminobenzene, 1,3-diaminobenzene, 1,4-diaminobenzene and derivatives of these compounds.

Derivatives of the specific aromatic compound include a specific aromatic compound having a substitute, such as an alkyl group of from 1 to 8 carbon atoms, on the benzene ring. A single kind of the specific aromatic compound may be used alone, or two or more kinds may be used in combination.

From the viewpoint of forming a smectic structure in a cured product obtained by curing the epoxy compound, the specific aromatic compound is preferably at least one selected from the group consisting of 1,4-dihydroxybenzene and 1,4-diaminobenzene. Since the compounds have the hydroxy groups or the amino groups at a para position with respect to each other, an epoxy compound obtained by reacting the compound with an epoxy monomer tends to have a straight structure. Therefore, a smectic structure tends to be formed in a cured product due to a high degree of stacking of the molecules.

The type of the reaction catalyst is not particularly limited, and may be selected based on the reaction rate, reaction temperate, storage stability and the like. Specific examples of the reaction catalyst include an imidazole compound, an organic phosphorous compound, a tertiary amine compound and a quaternary ammonium salt. A single kind of the reaction catalyst may be used alone, or two or more kinds may be used in combination.

From the viewpoint of heat resistance of a cured product, the reaction catalyst is preferably an organic phosphorous compound.

Preferred examples of the organic phosphorous compound include an organic phosphine compound; a compound having intermolecular polarization obtained by adding, to an organic phosphine compound, a compound having a π bond such as a maleic acid anhydride, a quinone compound, diazodiphenyl methane or a phenol resin; and a complex formed by an organic phosphine compound and an organic boron compound.

Specific examples of the organic phosphine compound include triphenylphosphine, diphenyl(p-tolyl)phosphine, tris (alkylphenyl)phosphine, tris(alkoxyphenyl)phosphine, tris (alkylalkoxyphenyl)phosphine, tris(dialkylphenyl)phosphine, tris(trialkylphenyl)phosphine, tris(tetraalkylphenyl) phosphine, tris(dialkoxyphenyl)phosphine, tris (trialkoxyphenyl)phosphine, tris(tetraalkoxyphenyl) phosphine, trialkylphosphine, dialkylarylphosphine and alkyldiarylphosphine.

Specific examples of the quinone compound include 1,4-benzoquinone, 2,5-toluquinone, 1,4-naphthoquinone, 2,3-dimethylbenzoquinone, 2,6-dimethylbenzoquinone, 2,3-dimethoxy-5-methyl-1,4-benzoquinone, 2,3-dimethoxy-1,4-benzoquinone and phenyl-1,4-benzoquinone.

Specific examples of the organic boron compound include tetraphenyl borate, tetra-p-tolyl borate and tetra-n-butyl borate.

The amount of the reaction catalyst is not particularly limited. From the viewpoint of reaction rate and storage stability, the amount of the reaction catalyst is preferably from 0.1 parts by mass to 1.5 parts by mass, more preferably from 0.2 parts by mass to 1 part by mass, with respect to 100 parts by mass of the total amount of the epoxy monomer and the compound having a functional group that is capable of reacting with an epoxy group of the epoxy monomer.

In a case of synthesizing a multimer by using an epoxy monomer, the total of the epoxy monomer may react to form a multimer, or the epoxy monomer may partly remain in an unreacted state.

A multimer can be synthesized by using a reaction container, such as a flask in a small scale or a reaction cauldron in a large scale. A specific example of the synthesis method is described below.

An epoxy monomer is placed in a reaction container and a solvent is added as necessary, and the epoxy monomer is dissolved by heating the reaction container to a reaction temperature with an oil bath or a heating medium. Then, a compound having a functional group that is capable of reacting with an epoxy group of the epoxy monomer is added thereto. After dissolving the compound in the solvent, a reaction catalyst is added as necessary, thereby starting the reaction. Subsequently, the solvent is removed under reduced pressure as necessary, and a multimer is obtained.

The reaction temperature is not particularly limited, as long as the reaction of an epoxy group and a functional group that is capable of reacting with an epoxy group can proceed. For example, the reaction temperature is preferably in a range of from 100° C. to 180° C., more preferably from 100° C. to 150° C. When the reaction temperature is 100° C. or higher, the time for completing the reaction tends to be shortened. When the reaction temperature is 180° C. or less, possibility of causing gelation tends to be reduced.

The ratio of the epoxy monomer to the compound having a functional group that is capable of reacting with an epoxy group of the epoxy monomer, used for the synthesis of the multimer, is not particularly limited. For example, the ratio may be adjusted to satisfy a ratio of the number of equivalent of epoxy group (A) to the number of equivalent of the functional group that is capable of reacting with an epoxy group (B), represented by A/B, of from 100/100 to 100/1. From the viewpoint of fracture toughness and heat resistance of a cured product, the value of A/B is preferably from 100/50 to 100/1.

The structure of the multimer can be determined by, for example, matching a molecular weight of the multimer, which is presumed to be obtained by the reaction of the epoxy monomer and the compound having a functional group that is capable of reacting with an epoxy group of the epoxy monomer, with a molecular weight of a target compound obtained by liquid chromatography that is performed by a liquid chromatograph having a UV spectrum detector and a mass spectrum detector.

The weight average molecular weight (Mw) of the epoxy resin is not particularly limited, and may be selected depending on the desired properties of the epoxy resin.

<Epoxy Resin Composition>

The epoxy resin composition of the embodiment includes the epoxy resin of the embodiment as described above, and a curing agent.

(Curing Agent)

The curing agent is not particularly limited, as long as it is capable of causing a curing reaction with the epoxy resin included in the epoxy resin composition. Specific examples of the curing agent include an amine curing agent, a phenol curing agent, an acid anhydride curing agent, a polymercaptan curing agent, a polyaminoamide curing agent, an isocyanate curing agent, and a block isocyanate curing agent. A single kind of the curing agent may be used alone, or two or more kinds may be used in combination.

From the viewpoint of forming a higher-order structure in a cured product of the epoxy resin composition, the curing agent is preferably an amine curing agent, having an amino group as a functional group that reacts with an epoxy resin; or a phenol curing agent, having a hydroxy group as a functional group that reacts with an epoxy resin, more preferably an amine curing agent. From the viewpoint of curing time, the curing agent is further preferably a compound having two or more amino groups that are directly bonded to an aromatic ring. Preferred examples of the aromatic ring include a benzene ring or a naphthalene ring.

Specific examples of the amine curing agent include 3,3'-diaminodiphenylsulfone, 4,4'-diaminodiphenylsulfone, 4,4'-diaminodiphenylmethane, 4,4'-diaminodiphenylether, 4,4'-diamino-3,3'-dimethoxybiphenyl, 4,4'-diaminophenylbenzoate, 1,5-diaminonaphthalene, 1,3-diaminonaphthalene, 1,4-diaminonaphthalene, 1,8-diaminonaphthalene, 1,3-diaminobenzene, 1,4-diaminobenzene, 4,4'-diaminobenzanilide and trimethylene-bis-4-aminobenzoate.

From the viewpoint of forming a smectic structure in a cured product of the epoxy resin composition, the curing agent is preferably selected from 4,4'-diaminodiphenylsulfone, 3,3'-diaminodiphenylsulfone, 1,3-diaminobenzene, 1,4-diaminobenzene, 4,4'-diaminobenzanilide, 1,5-diaminonaphthalene, 4,4'-diaminodiphenylmethane and trimethylene-bis-4-aminobenzoate. From the viewpoint of obtaining a cured product with a high Tg, the curing agent is more preferably 4,4'-diaminodiphenylsulfone and 4,4'-diaminobenzanilide.

The content of the curing agent in the epoxy resin composition is not particularly limited. From the viewpoint of efficiency of curing reaction, the content of the curing agent preferably satisfies a ratio of the active hydrogen equivalent amount of the curing agent (A) to the epoxy equivalent amount of the epoxy resin B (A/B) of from 0.3 to 3.0, more preferably from 0.5 to 2.0.

(Other Components)

The epoxy resin composition may include components other than the epoxy resin and the curing agent. For example, the epoxy resin composition may include a curing catalyst, a filler or the like. Specific examples of the curing catalyst include the compounds as described above as a reaction catalyst used for the synthesis of the specific epoxy compound.

The epoxy resin composition preferably has a crosslink density, in a cured state, of 7 mmol/cm$^3$ or less. The crosslink density of a cured product of the epoxy resin composition is measured by a method as described in the following Examples.

The epoxy resin composition preferably has a fracture toughness, in a cured state, of 1.2 MPa·m$^{1/2}$ or more. The fracture toughness of a cured product of the epoxy resin composition is measured by a method as described in the following Examples.

(Use Application)

The use application of the epoxy resin composition is not particularly limited. The epoxy resin composition is suitably applied for a process in which the epoxy resin composition is subjected to relatively rapid heating. For example, the epoxy resin composition may be used for a process of producing FRPs (Fiber-Reinforced Plastics), in which fibers are impregnated with an epoxy resin composition while heating, or a process of producing a sheet-like product in which an epoxy resin composition is spread with a squeegee or the like while heating.

The epoxy resin composition is also suitably applied for a process in which addition of a solvent for adjusting viscosity is desired to be omitted or reduced, for the purpose of suppressing formation of voids in a cured product.

<Epoxy Resin Cured Product and Composite Material>

The epoxy resin cured product of the embodiment is obtained by curing the epoxy resin composition of the embodiment. The composite material includes the epoxy resin cured product of the embodiment and a reinforcing material.

Specific examples of the reinforcing material include carbon material, glass, aromatic polyamide resins such as Kevlar (registered trade name), ultra high molecular weight polyethylene, alumina, boron nitride, aluminum nitride, mica and silicon. The form of the reinforcing material is not particularly limited, and examples thereof include fibers and particles (filler). The composite material may include a single kind of reinforcing material alone, or may include two or more kinds in combination.

The configuration of the composite material is not particularly limited. For example, the composite material may have a structure configured by layering at least a cured product-containing layer, including a cured product of the epoxy resin, and at least one reinforcing material-containing layer, including a reinforcing material.

EXAMPLES

In the following, the invention is explained by referring to the Examples. However, the invention is not limited to these Examples.

(Synthesis of Epoxy Resin A)

To a 500-mL three-necked flask, 50 parts by mass of an epoxy monomer having the following structure (refer to JP-B 5471975) were placed, and 80 parts by mass of a solvent (cyclohexanone) were added. A cooling tube and a nitrogen inlet tube were attached to the flask, and a stirring blade was attached so as to be immersed in the solvent. Then, the flask was immersed in an oil bath at 160° C. and subjected to stirring. After confirming that the epoxy monomer was dissolved and the solution became clear, 3.1 parts by mass of a specific aromatic compound (hydroquinone) and 0.5 parts by mass of a reaction catalyst (triphenylphosphine) were added, and further heated at 160° C. After continuing the heating for 5 hours, cyclohexanone was evaporated under reduced pressure, and the residue was cooled to room temperature (25° C.). Epoxy resin A, including a reaction product of the epoxy compound and the specific aromatic compound, the epoxy compound remaining unreacted, and a part of the solvent, was thus obtained.

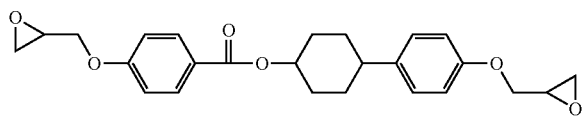

(Synthesis of Epoxy Resin B)

Epoxy resin B was synthesized by the same conditions of the synthesis of Epoxy Resin A, except that the amount of the specific aromatic compound (hydroquinone) was changed from 3.1 parts by mass to 3.7 parts by mass. In epoxy resin B, a reaction product of the epoxy compound and the specific aromatic compound, the epoxy compound remaining unreacted, and a part of the solvent were included.

Example 1

An epoxy resin mixture was obtained by mixing 73.6 parts by mass (non-volatile component) of epoxy resin A and 9.2 parts by mass of an epoxy compound having the following structure (YX4000H, Mitsubishi Chemical Corporation). To the mixture, 17.2 parts by mass of 4,4'-diaminodiphenylsulfone as a curing agent were placed to prepare an epoxy resin composition.

The epoxy resin composition was placed in a stainless dish, and was heated on a hot plate to 180° C. After the epoxy resin composition was melted, it was heated at 180° C. for 1 hour. After cooling to room temperature (25° C.), the epoxy resin composition was taken out from the dish, and was heated in an oven at 230° C. for 1 hour, thereby obtaining a cured product of the epoxy resin composition.

A sample for evaluating fracture toughness having a size of 3.75 mm×7.5 mm×33 mm and a sample for evaluating glass transition temperature having a size of 2 mm×0.5 mm×40 mm were prepared from the cured product of the epoxy resin composition, respectively.

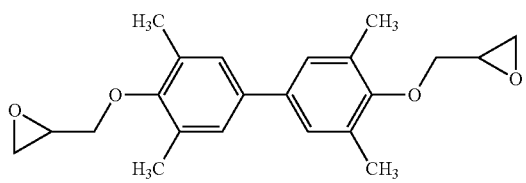 [SMILES: Cc1cc(-c2cc(C)c(OCC3CO3)c(C)c2)cc(C)c1OCC1CO1]

Example 2

An epoxy resin mixture, an epoxy resin composition and samples for evaluation were obtained in the same manner as Example 1, by using 71.8 parts by mass (non-volatile component) of epoxy resin A, 10.8 parts by mass of an epoxy compound (YX4000H) and 17.4 parts by mass of 4,4'-diaminodiphenylsulfone.

Example 3

An epoxy resin mixture, an epoxy resin composition and samples for evaluation were obtained in the same manner as Example 1, by using 70.2 parts by mass (non-volatile component) of epoxy resin A, 12.3 parts by mass of an epoxy compound (YX4000H) and 17.5 parts by mass of 4,4'-diaminodiphenylsulfone.

Example 4

An epoxy resin mixture, an epoxy resin composition and samples for evaluation were obtained in the same manner as Example 1, by using 68.3 parts by mass (non-volatile component) of epoxy resin A, 13.7 parts by mass of an epoxy compound having the following structure (YL6121H, Mitsubishi Chemical Corporation, a mixture of R=hydrogen atom and R=methyl group by 1:1) and 18.1 parts by mass of 4,4'-diaminodiphenylsulfone.

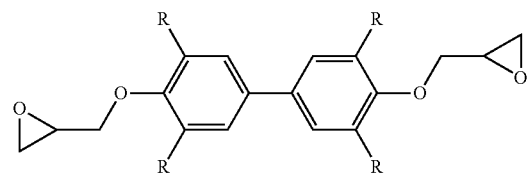

Example 5

An epoxy resin mixture, an epoxy resin composition and samples for evaluation were obtained in the same manner as Example 1, by using 76.2 parts by mass (non-volatile component) of epoxy resin B, 7.6 parts by mass of an epoxy compound (YX4000H) and 16.2 parts by mass of 4,4'-diaminodiphenylsulfone.

Example 6

An epoxy resin mixture, an epoxy resin composition and samples for evaluation were obtained in the same manner as Example 1, by using 62.9 parts by mass (non-volatile component) of epoxy resin A, 18.9 parts by mass of an epoxy compound (YX4000H) and 18.2 parts by mass of 4,4'-diaminodiphenylsulfone.

Comparative Example 1

An epoxy resin mixture, an epoxy resin composition and samples for evaluation were obtained in the same manner as Example 1, by using 83.8 parts by mass (non-volatile component) of epoxy resin A and 16.2 parts by mass of 4,4'-diaminodiphenylsulfone.

Comparative Example 2

An epoxy resin mixture, an epoxy resin composition and samples for evaluation were obtained in the same manner as Example 1, by using 79.4 parts by mass (non-volatile component) of epoxy resin A, 4.0 parts by mass of an epoxy compound (YX4000H) and 16.7 parts by mass of 4,4'-diaminodiphenylsulfone.

Comparative Example 3

An epoxy resin mixture was obtained by mixing 66.2 parts by mass (non-volatile component) of epoxy resin A and 13.2 parts by mass of an epoxy compound having the following structure (YH434, Nippon Steel Chemical & Material Co., Ltd.)

To the mixture, 20.6 parts by mass of 4,4'-diaminodiphenylsulfone as a curing agent were placed to prepare an epoxy resin composition.

The epoxy resin composition was placed in a stainless dish, and was heated on a hot plate to 180° C. After the epoxy resin composition was melted, it was heated at 150° C. for 1 hour. After cooling to room temperature (25° C.), the epoxy resin composition was taken out from the dish, and was heated in an oven at 230° C. for 1 hour, thereby obtaining a cured product of the epoxy resin composition. Samples for evaluation were prepared from the cured product in the same manner to Example 1.

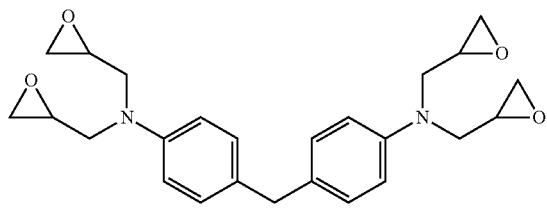 [SMILES: c1cc(N(CC2CO2)CC2CO2)ccc1Cc1ccc(N(CC2CO2)CC2CO2)cc1]

(Viscosity at 60° C.)

The viscosity of the epoxy resin mixtures, used for the preparation of the epoxy resin compositions in Examples 1 to 6 and Comparative Example 1-3, was measured with a rheometer (MCR301, Anton-Paar GmbH).

Specifically, a process of decreasing the temperature of the epoxy resin mixture from 150° C. to 30° C. and a process of increasing the temperature of the epoxy resin mixture from 30° C. to 150° C. were performed in this order, and a viscosity at 60° C. in the process of increasing the temperature (Pa·s) was measured. The measurement was performed at a frequency of 1 Hz and a rate of temperature decrease and elevation of 2° C./min, with a plate having a diameter of 12 mm and a gap of 0.2 mm.

(Existence and State of Higher-Order Structure)

The samples prepared in Examples 1-6 and Comparative Examples 1-3 were analyzed using a X-ray diffractometer (Rigaku Corporation) to determine the existence of a higher-order structure and the state thereof (the structure is smectic or not). The measurement was conducted by using CuKα1 line, under a tube voltage of 40 kV, a tube current of 20 mA and a measurement range of 2θ=1° to 30°.

<Evaluation of Fracture Toughness>

The fracture toughness (MPa·m$^{1/2}$) of the samples prepared in Examples 1-6 and Comparative Example 1-3 was measured by a three-point bending test according to ASTM D5045 with a tester (Instron 5948, Instron).

(Glass Transition Temperature)

The glass transition temperature (Tg, ° C.) of the samples prepared in Examples 1-6 and Comparative Example 1-3 was calculated from the results obtained by dynamic viscoelasticity measurement at a tensile mode. The measurement was performed at a frequency of 10 Hz, a rate of temperature elevation of 5° C./min, and a distortion of 0.1%, using RSA-G2 (TA Instruments).

(Crosslink Density)

The crosslink density (mmol/cm$^3$) of the samples prepared in Examples 1-6 and Comparative Example 1-3 was calculated from the storage elastic modulus at 280° C., measured by dynamic viscoelasticity measurement at a tensile mode, by the following formula. The measurement was performed at a frequency of 10 Hz, a rate of temperature elevation of 5° C./min, and a distortion of 0.1%. In the formula, the Front constant and the gas constant were given as 1 and 8.31, respectively.

Crosslink density=storage elastic modulus/(3×Front constant×gas constant×absolute temperature)

The viscosity at 60° C. of the epoxy resin mixtures and the existence or state of higher-order structure, fracture toughness, glass transition temperature and crosslink density of the samples, prepared in Examples 1-6 and Comparative Example 1-3, are shown in Table 1.

TABLE 1

| | 1st:2nd:other (ratio by mass) | Higher-order structure | Viscosity (Pa · s) | Tg (° C.) | Crosslink density (mmol/cm$^3$) | Fracture toughness (MPa · m$^{1/2}$) |
|---|---|---|---|---|---|---|
| Example 1 | 12.5:100:0 | Smectic | 100 | 227 | 6.6 | 1.32 |
| Example 2 | 15:100:0 | Smectic | 110 | 227 | 6.0 | 1.28 |
| Example 3 | 17.5:100:0 | Smectic | 123 | 229 | 4.8 | 1.41 |
| Example 4 | 20:100:0 | Smectic | 62 | 231 | 6.9 | 1.22 |
| Example 5 | 10:100:0 | Smectic | 180 | 193 | 3.4 | 1.49 |
| Example 6 | 30:100:0 | None | 120 | 231 | 4.1 | 1.00 |
| Comparative Example 1 | 0:100:0 | Smectic | 7340 | 224 | 8.3 | 1.36 |
| Comparative Example 2 | 5:100:0 | Smectic | 2570 | 226 | 7.3 | 1.29 |
| Comparative Example 3 | 0:100:20 | Smectic | 1000 | 237 | 3.3 | 1.08 |

As shown in Table 1, the epoxy resin mixtures of the Examples, including a first epoxy compound, have a lower viscosity at 60° C. than the epoxy resin mixture of Comparative Example 1, not including a first epoxy compound.

The epoxy resin mixture of Comparative Example 2, having a smaller ratio of the first epoxy compound than the Examples, has a higher viscosity at 60° C.

The epoxy resin mixture of Comparative Example 3, including an epoxy compound that is different from the first epoxy compound, has a higher viscosity at 60° C. and a smaller fracture toughness than the Examples.

The disclosure of Japanese Patent Application No. 2017-050145 is incorporated herein in its entirety by reference.

All publications, patent applications, and technical standards mentioned in this specification are herein incorporated by reference to the same extent as if each individual publication, patent application, or technical standard was specifically and individually indicated to be incorporated by reference.

The invention claimed is:

1. An epoxy resin, comprising an epoxy compound having a mesogenic structure,
   the epoxy compound comprising a first epoxy compound having one biphenyl structure in a molecule and a second epoxy compound that is different from the first epoxy compound, at a mass ratio of the first epoxy compound to the second epoxy compound (first epoxy compound: second epoxy compound) of from 10:100 to 50:100,
   wherein the second epoxy compound comprises an epoxy compound having one mesogenic structure and an epoxy compound having two or more mesogenic structures each represented by the following Formula (B):

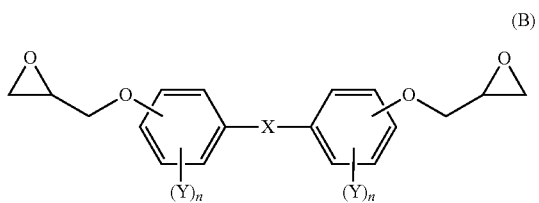

(B)

wherein, in Formula (B), X represents a linking group comprising at least one divalent group having the following structure:

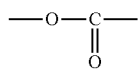

each Y independently represents an aliphatic hydrocarbon group having 1 to 8 carbon atoms, an aliphatic alkoxy group having 1 to 8 carbon atoms, a fluorine atom, a chlorine atom, a bromine atom, an iodine atom, a cyano group, a nitro group or an acetyl group; and each n independently represents an integer from 0 to 4.

2. The epoxy resin according to claim 1, wherein the first epoxy compound comprises an epoxy compound represented by the following Formula (A):

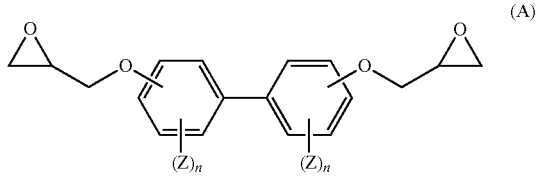

(A)

wherein, in Formula (A), each Z independently represents an aliphatic hydrocarbon group having 1 to 8 carbon atoms, an aliphatic alkoxy group having 1 to 8 carbon atoms, a fluorine atom, a chlorine atom, a bromine atom, an iodine atom, a cyano group, a nitro group or an acetyl group; and each n independently represents an integer from 0 to 4.

3. The epoxy resin according to claim 1, wherein the mass ratio of the first epoxy compound to the second epoxy compound (first epoxy compound: second epoxy compound) is from 10:100 to 25:100.

4. The epoxy resin according to claim 1, having a viscosity at 60° C. of less than 200 Pa·s.

5. An epoxy resin composition, comprising the epoxy resin according to claim 1 and a curing agent.

6. The epoxy resin composition according to claim 5, wherein the curing agent comprises an amine compound having a benzene ring or a naphthalene ring.

7. The epoxy resin composition according to claim 6, wherein the amine compound has an amino group that is directly bonded to the benzene ring or the naphthalene ring.

8. The epoxy resin composition according to claim 5, having a crosslink density of 7 mmol/cm$^3$ or less when the epoxy resin composition is cured.

9. The epoxy resin composition according to claim 5, having a fracture toughness of 1.2 MPa·m$^{1/2}$ or more when the epoxy resin composition is cured.

10. A cured epoxy resin obtained by curing the epoxy resin composition according to claim 5.

11. A composite material, comprising the cured epoxy resin according to claim 10 and a reinforcing material.

12. The composite material according to claim 11, having a structure configured by layering at least a cured product-containing layer, comprising the cured epoxy resin, and at least one reinforcing material-containing layer, comprising the reinforcing material.

13. The epoxy resin according to claim 1, wherein X of the epoxy compound represented by Formula (B) further comprises a divalent group having the following structure:

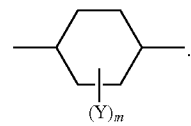

14. The epoxy resin according to claim 1, wherein the epoxy compound represented by Formula (B) comprises one or more structures represented by the following formula (I):

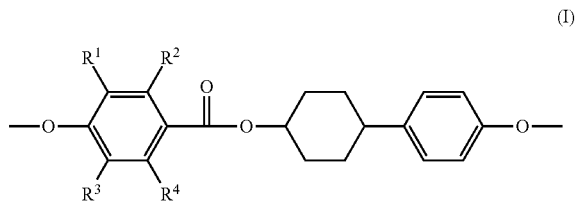

(I)

wherein, in Formula (I), each of $R^1$ to $R^4$ independently represents a hydrogen atom or an alkyl group having from 1 to 3 carbon atoms.

* * * * *